(12) United States Patent
Uejo (10) Patent No.: US 11,366,622 B2
(45) Date of Patent: Jun. 21, 2022

(54) IMAGE FORMING APPARATUS, MANAGEMENT SYSTEM, METHOD OF MANAGING IMAGE FORMING APPARATUS

(71) Applicant: Ricoh Company, Ltd., Tokyo (JP)

(72) Inventor: Masahiko Uejo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/089,821

(22) Filed: Nov. 5, 2020

(65) Prior Publication Data

US 2021/0149604 A1 May 20, 2021

(30) Foreign Application Priority Data

Nov. 20, 2019 (JP) .............................. JP2019-209703
Oct. 7, 2020 (JP) .............................. JP2020-170011

(51) Int. Cl.
*G06F 3/12* (2006.01)

(52) U.S. Cl.
CPC ............ *G06F 3/122* (2013.01); *G06F 3/1273* (2013.01); *G06F 3/1274* (2013.01)

(58) Field of Classification Search
CPC ...... G06F 3/122; G06F 3/1274; G06F 3/1273; G06F 3/129
See application file for complete search history.

(56) References Cited

U.S. PATENT DOCUMENTS

| | | | | |
|---|---|---|---|---|
| 2008/0018931 | A1* | 1/2008 | Tanaka ................. | G06F 3/1204 358/1.15 |
| 2010/0080572 | A1* | 4/2010 | Tsuzuki ............. | G03G 15/5075 399/10 |
| 2010/0265530 | A1* | 10/2010 | Takechi ................ | G06F 3/1239 358/1.14 |
| 2014/0153050 | A1* | 6/2014 | Enomoto .............. | G06F 3/1285 358/1.16 |
| 2014/0344402 | A1* | 11/2014 | Tivey ................. | G05B 23/0216 709/217 |
| 2015/0324161 | A1* | 11/2015 | Shibuya ................ | G06F 3/1288 358/1.15 |
| 2019/0199862 | A1* | 6/2019 | Kanematsu .......... | H04N 1/0009 |

FOREIGN PATENT DOCUMENTS

| | | |
|---|---|---|
| JP | 2006-004165 | 1/2006 |
| JP | 2012-108887 | 6/2012 |

* cited by examiner

*Primary Examiner* — Huo Long Chen
(74) *Attorney, Agent, or Firm* — Xsensus LLP (57) ABSTRACT

An image forming apparatus includes a memory and circuitry. The circuitry is configured to generate log information including formed image information, based on a printing job; store the log information in the memory; and transfer the log information to a server that is externally provided and delete the log information stored in the memory based on determination that a predetermined condition is satisfied and that the log information is to be transferred based on the log information stored in memory.

11 Claims, 6 Drawing Sheets

IMAGE FORMING APPARATUS, MANAGEMENT SYSTEM, METHOD OF MANAGING IMAGE FORMING APPARATUS

CROSS-REFERENCE TO RELATED APPLICATIONS

This patent application is based on and claims priority under 35 U.S.C. § 119(a) to Japanese Patent Application Nos. 2019-209703, filed on Nov. 20, 2019, and 2020-170011, filed on Oct. 7, 2020 in the Japan Patent Office, the entire disclosures of which are incorporated herein by reference.

BACKGROUND

Technical Field

The present disclosure relates to an image forming apparatus, a management system, a method of managing an image forming apparatus.

Related Art

An image forming apparatus is known that transfers log information including image information recorded at the time of execution of a printing job to a server.

For example, when a copier function is used, image information is stored in a temporary area. Further, when the log information including the image information is generated, the image information is stored in a local storage such as a hard disk. Furthermore, when a copy storage function is used, the log information is stored in the local storage.

When the image forming apparatus is restarted after the power supply is cut off such as a power plug is inadvertently plugged out from an outlet or a power failure occurs, the image forming apparatus transfers a part of the log information to be transferred and deletes another part of the log information among the log information that has not been transferred.

For example, a configuration is known that, for the purpose of transferring image information, determines whether to transfer the image information based on a remaining free space required for performing image processing and a remaining free space in a storage area of a server, and then transfers the image information.

SUMMARY

According to an embodiment, an image forming apparatus includes a memory and circuitry. The circuitry is configured to generate log information including formed image information, based on a printing job; store the log information in the memory; and transfer the log information to a server that is externally provided and delete the log information stored in the memory based on determination that a predetermined condition is satisfied and that the log information is to be transferred based on the log information stored in memory.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are diagrams each illustrating a structure and timing of an image log used in the management system according to an embodiment of the present disclosure, wherein FIG. 4A illustrates a case in which a cut-off of the power supply occurs after the image log is generated, and FIG. 4B illustrates a case in which a cut-off of the power supply occurs while the image log is being generated;

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present disclosure is described below with reference to the drawings.

The components, types, combinations, shapes, relative arrangements, and the like described in this embodiment are merely illustrative examples and not intended to limit the scope of the present disclosure only unless otherwise indicated.

Figure 1:
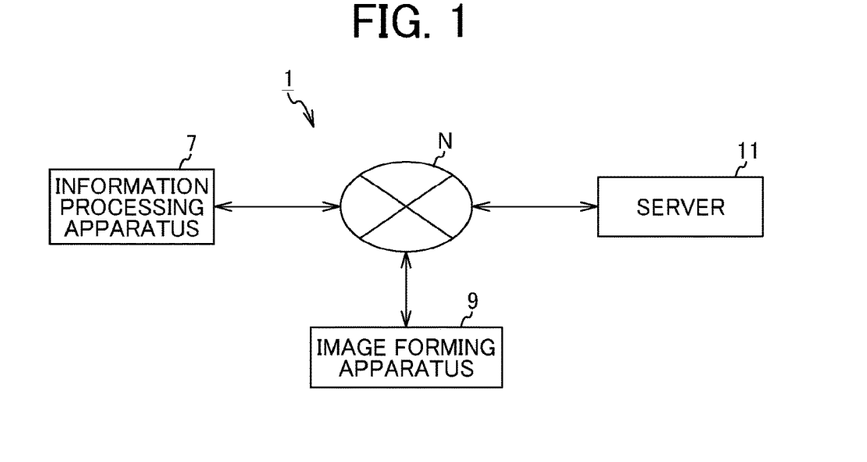
FIG. 1 is a block diagram illustrating an example of a configuration of a management system, according to an embodiment of the present disclosure.

System Configuration:

FIG. 1 is a block diagram illustrating an example of a configuration of a management system 1, according to an embodiment of the present disclosure.

The management system 1 includes an information processing apparatus 7, an image forming apparatus 9, and a server 11, which are communicable with each other through a network N.

The information processing apparatus 7 is, for example, a personal computer. The information processing apparatus 7 generates a printing job, and transmits the printing job to the image forming apparatus 9.

The image forming apparatus 9 is communicably connected to the information processing apparatus 7 through the network N, and prints the printing job received from the information processing apparatus 7.

The server 11 stores an image log from the image forming apparatus 9 through the network N.

Figure 2:
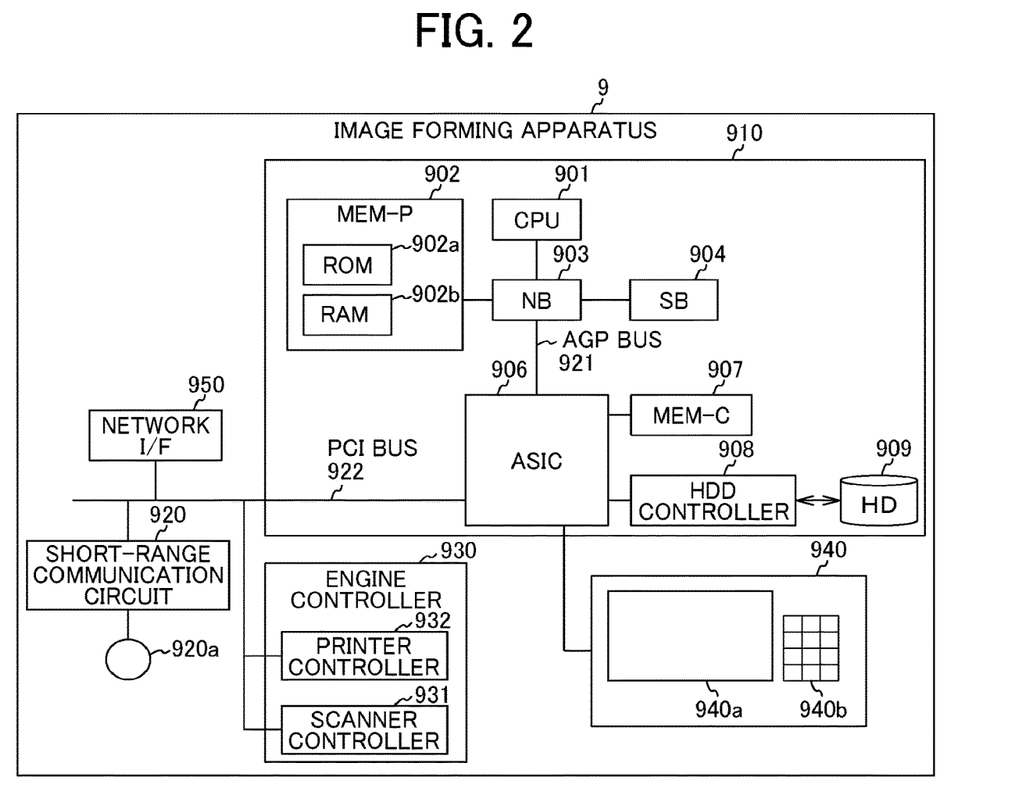
FIG. 2 is a block diagram illustrating an example of a hardware configuration of an image forming apparatus, according to an embodiment of the present disclosure.

Hardware Configuration of Image Forming Apparatus:

FIG. 2 is a block diagram illustrating an example of a hardware configuration of the image forming apparatus 9, according to an embodiment of the present disclosure.

FIG. 2 is a block diagram illustrating an example of a hardware configuration of a multifunction peripheral (MFP), which is an example of the image forming apparatus 9. As illustrated in FIG. 2, the MFP includes a controller 910, a short-range communication circuit 920, an engine controller 930, a control panel 940, and a network interface (I/F) 950.

The controller 910 includes a central processing unit (CPU) 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, a hard disk drive (HDD) controller 908, and a hard disk (HD) 909 as a storage unit. The NB 903 and the ASIC 906 are connected through an Accelerated Graphics Port (AGP) bus 921.

The CPU 901 is a controller that controls entire operation of the MFP. The NB 903 connects the CPU 901 with the MEM-P 902, the SB 904, and the AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902a as a memory that stores program and data for implementing various functions of the controller 910. The MEM-P 902 further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a PCI device and a peripheral device. The ASIC 906 is an integrated circuit (IC) dedicated to an image processing use, and connects the AGP bus 921, a PCI bus 922, the HDD controller 908, and the MEM-C 907 to each other. The ASIC 906 includes a PCI target, an AGP master, an arbiter (ARB) as a central processor of the ASIC 906, a memory controller, a plurality of direct memory access controllers (DMACs), and a PCI unit. The memory controller controls the MEM-C 907. The DMACs is capable of converting coordinates of image data with a hardware logic. The PCI unit transfers data between a scanner controller 931 and a printer controller 932 through the PCI bus 922. The ASIC 906 may be connected to a universal serial bus (USB) interface, or the Institute of Electrical and Electronics Engineers 1394 (IEEE1394) interface.

The MEM-C 907 is a local memory used as a buffer for image data to be copied or a code buffer. The HD 909 stores various image data, font data for printing, and form data. The HDD controller 908 controls reading and writing of various data from and to the HD 909 under control of the CPU 901.

The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 is provided with a short-range communication antenna 920a. The short-range communication circuit 920 is a communication circuit that communicates in compliance with the near field communication (NFC), the Bluetooth (registered trademark) and the like.

The engine controller 930 includes the scanner controller 931 and the printer controller 932. The control panel 940 includes a panel display 940a and an operation panel 940b. The panel display 940a is implemented by, for example, a touch panel that displays current settings or a selection screen and receives a user input. The operation panel 940b includes a numeric keypad that receives set values of various image forming parameters such as image density parameter and a start key that accepts an instruction for starting copying. The controller 910 controls entire operation of the MFP. For example, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP selectively performs a document box function, a copier function, a printer function, and a facsimile function. When the document box function is selected, the MFP changes its operating mode to a document box mode to store document data. When the copier function is selected, the MFP operates in a copy mode. When the printer function is selected, the MFP operates in a printer mode. When the facsimile function is selected, the MFP operates in a facsimile mode.

The network I/F 950 controls communication of data with an external device through the network N. The short-range communication circuit 920 and the network I/F 950 are electrically connected to the ASIC 906 through the PCI bus 922.

Figure 3:
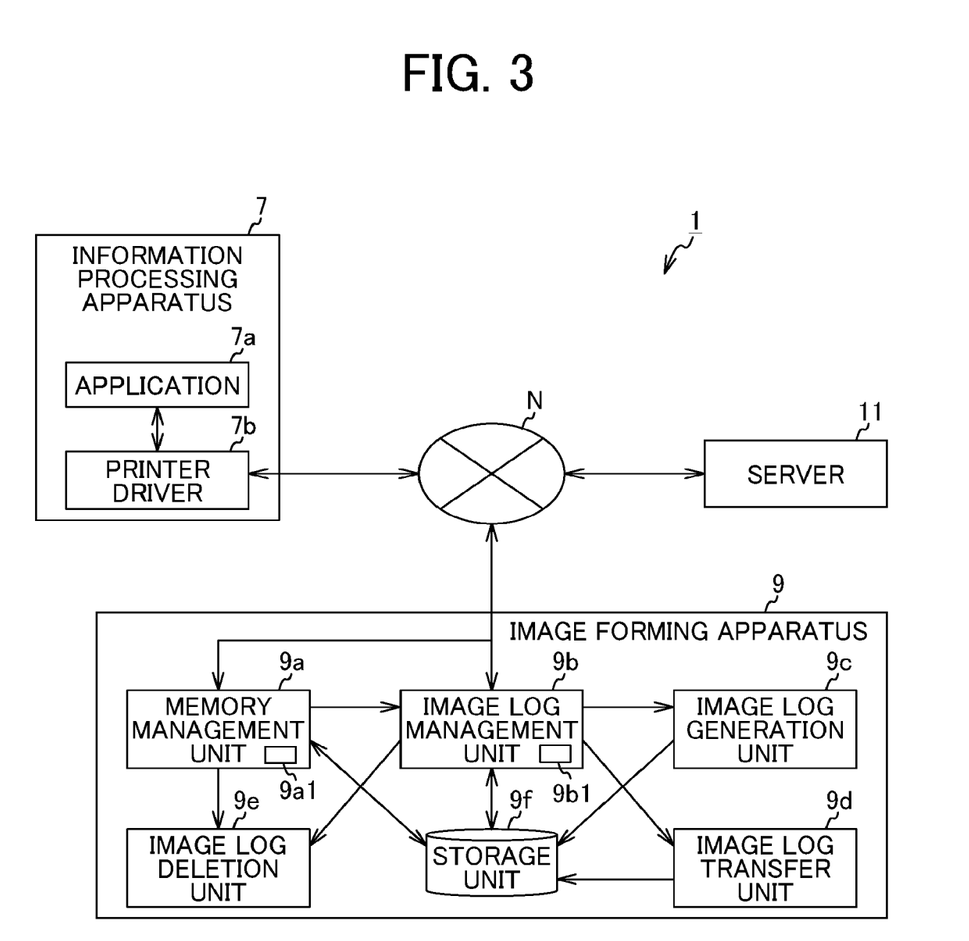
FIG. 3 is a block diagram illustrating an example of a functional configuration of the management system, according to the embodiment of the present disclosure.

Functional Configuration of Management System:

FIG. 3 is a block diagram illustrating an example of a functional configuration of the management system 1, according to the embodiment of the present disclosure.

The information processing apparatus 7 uses application software 7a to generate a printing job for image generation, and transmits the generated printing job to the image forming apparatus 9 through the network N.

The application software 7a is application software that executes printing to a printer driver 7b. Examples of the application software 7a include Word (registered trademark) and Excel (registered trademark).

The printer driver 7b is software for connecting to and operating the image forming apparatus 9 from the information processing apparatus 7 (computer). The printer driver 7b executes drawing processing, data storage processing, and instruction processing.

The printer driver 7b generates a printing job based on print data and print setting information created by the application software 7a, and transmits the generated printing job to the image forming apparatus 9.

The image forming apparatus 9 includes a storage unit 9f, an image log generation unit 9c, an image log transfer unit 9d, and an image log deletion unit 9e. The image log generation unit 9c generates log information including formed image information based on a printing job and stores the generated log information in the storage unit 9f. The image log transfer unit 9d transfers the log information stored in the storage unit 9f to the server 11 externally provided. The image log deletion unit 9e deletes the log information stored in the storage unit 9f.

In a case in which an image log management unit 9b determines that a predetermined condition is satisfied and that the log information is to be transferred based on the log information stored in the storage unit 9f, the image log management unit 9b controls the image log transfer unit 9d to transfer the log information to the server 11, and controls the image log deletion unit 9e to delete the log information stored in the storage unit 9f.

The image log management unit 9b determines that the log information is to be transferred when the log information includes at least one print page based on the log information stored in the storage unit 9f.

The image forming apparatus 9 further includes a memory management unit 9a. In a case in which the memory management unit 9a determines that the predetermined condition is satisfied and that the log information is not to be transferred based on the log information stored in the storage unit 9f, the memory management unit 9a controls the image log deletion unit 9e to delete the log information stored in the storage unit 9f.

The memory management unit 9a determines that the log information is not to be required to be transferred when the log information does not include at least one print page based on the log information stored in the storage unit 9f.

In the image forming apparatus 9, "in a case in which the predetermined condition is satisfied" is a case in which a cut-off of the power supply occurs and thereafter the image forming apparatus 9 is restarted.

The image log management unit 9b includes a power supply cutoff determination unit 9b1 that determines whether the cut-off of the power supply has occurred.

The memory management unit 9a includes a power supply cutoff determination unit 9a1 that determines whether the cut-off of the power supply has occurred.

When generation of the log information is completed, the image log generation unit 9c adds completion information indicating that the generation of the log information is completed to the log information. Further, the image log generation unit 9c stores the log information to which the completion information is added in the storage unit 9f.

For example, when the completion information is not added to the log information, the power supply cutoff determination unit 9a1 or the power supply cutoff determination unit 9b1 determines that the cut-off of the power supply has occurred, based on the log information stored in the storage unit 9f.

In another example, the power supply cutoff determination unit 9a1 or the power supply cutoff determination unit 9b1 acquires a numerical value of one word from a power supply cutoff detection area of the RAM 902b, which is a volatile memory. When the acquired numerical value is not a preset unique numerical value, the power supply cutoff determination unit 9a1 or the power supply cutoff determination unit 9b1 determines that the cut-off of the power supply has occurred, and turns on a power supply cutoff determination flag. When the power supply cutoff determination flag is on, the power supply cutoff determination unit 9a1 or the power supply cutoff determination unit 9b1 recognizes that the cut-off of the power supply has occurred.

The management system 1 includes the image forming apparatus 9 according to any one of the first to eighth aspects and the server 11 that stores log information transferred from the image forming apparatus 9.

The memory management unit 9a manages a storage area in the storage unit 9f. The memory management unit 9a sends a notification indicating the transfer of the log information. The memory management unit 9a determines whether a created image is to be transferred.

The image log management unit 9b sends notifications indicating generation, transfer, and deletion of the image log to each unit. The image log management unit 9b determines whether the created image is to be transferred.

The image log generation unit 9c generates the image log on the storage unit 9f.

The image log transfer unit 9d transfers the image log from the storage unit 9f to the server 11.

The image log deletion unit 9e deletes the image log from the storage unit 9f.

The storage unit 9f, which is implemented by at least one of the MEM-C 907 and the HD 909, is a storage area of a non-volatile memory inside the image forming apparatus 9.

The server 11 stores the image log. The image log is used, for example, to calculate a printing amount and/or a billed amount.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Figure 4A:
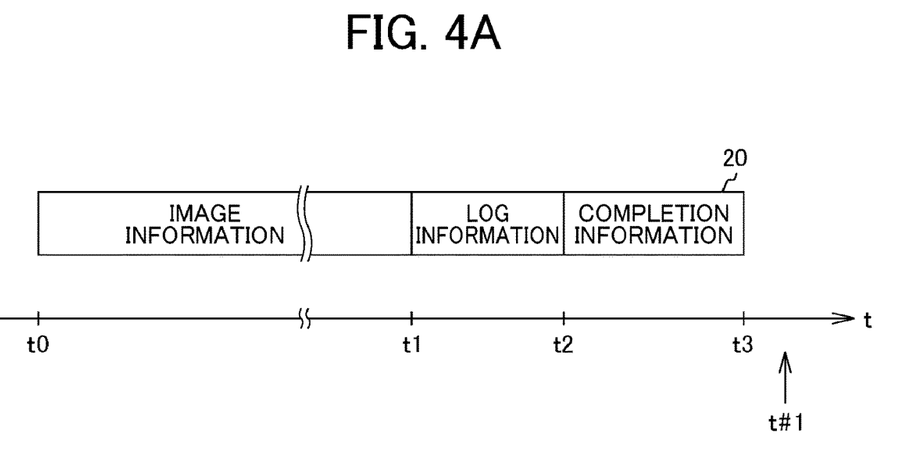
Figure 4B:
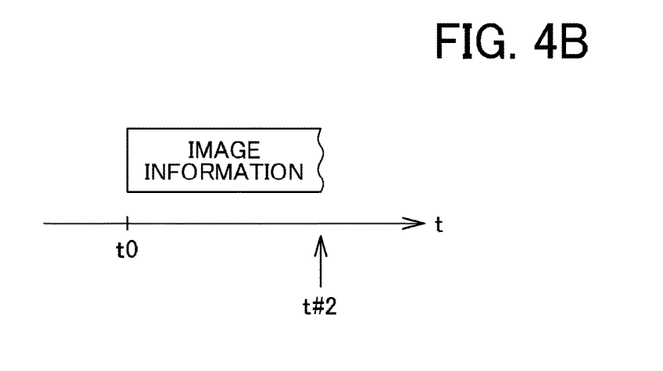

Structure and Timing of Image Log:

FIGS. 4A and 4B are diagrams each illustrating a structure and timing of an image log 20 used in the management system according to the embodiment of the present disclosure. FIG. 4A illustrates a case in which a cut-off of the power supply occurs after the image log 20 is generated. FIG. 4B illustrates a case in which a cut-off of the power supply occurs while the image log 20 is being generated.

The image log 20 includes image information, log information, and completion information.

The image information is generated by the engine controller 930.

The log information includes, but not limited to, a date and time related to a printing job, an IP address, a file number, operation information, information indicating a time stamp. The log information is generated by the image log generation unit 9c and stored in the storage unit 9f.

The completion information is generated by the image log generation unit 9c. When the generation of the log information is completed, the image log generation unit 9c adds the completion information indicating that the generation of the log information is completed to the log information. Further, the image log generation unit 9c stores the log information to which the completion information is added in the storage unit 9f.

In the following, an example is described in which, in the image log 20, the image information is formed from a time t0 to a time t1, the log information is generated from the times t1 to a time t2, and the completion information is generated from the time t2 to a time t3.

In the case illustrated in FIG. 4A, the image log 20 is already generated and stored in the storage unit 9f when the cut-off of the power supply occurs at a time t #1 after the time t3.

By contrast, in the case illustrated in FIG. 4B, the image information is in a process of being generated when the cut-off of the power supply occurs at a time t #2 after the time t0. In this case, although the image information in the process of generation is stored in the storage unit 9f, no information is stored in the storage unit 9f after the time t #2.

Figure 5:
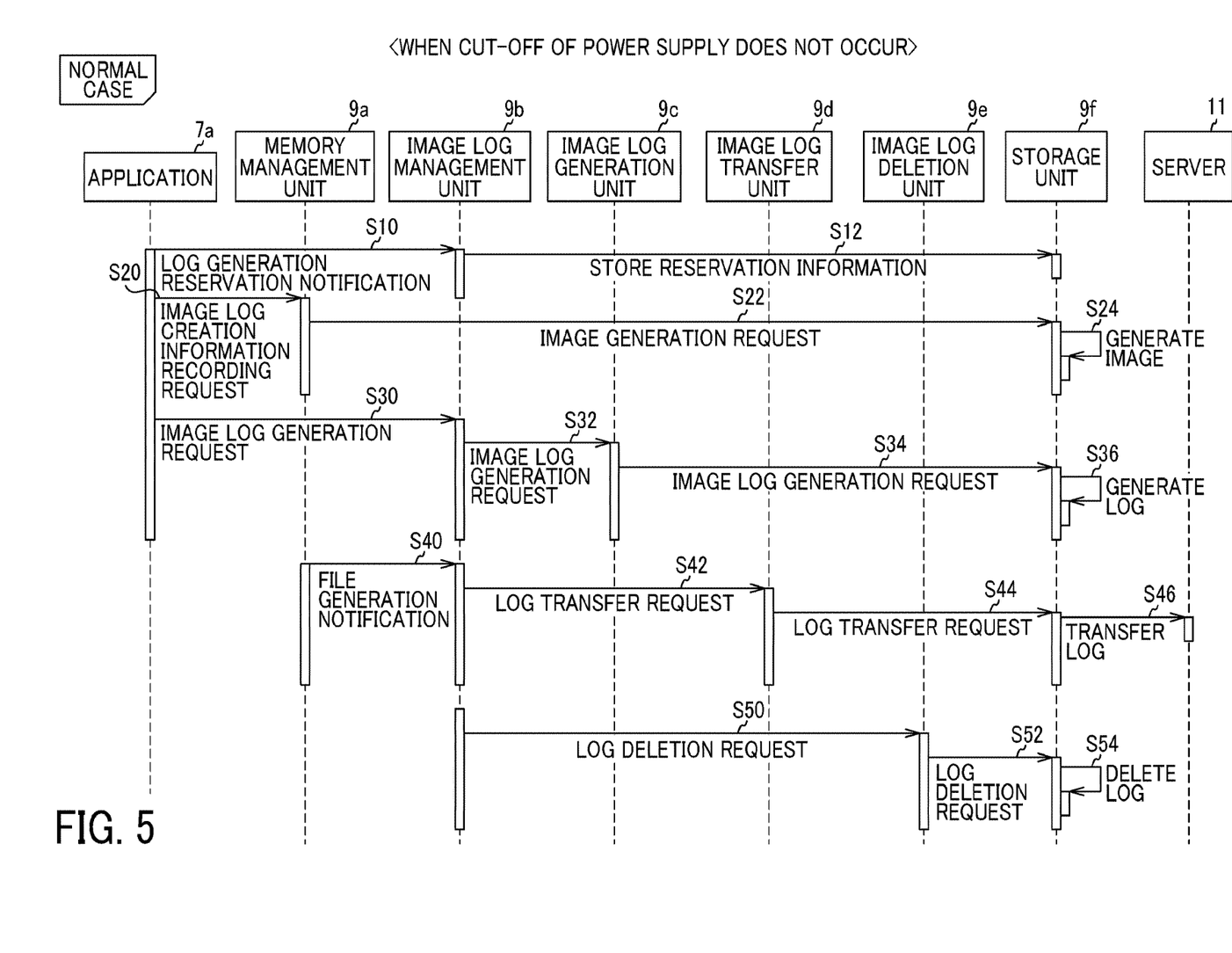
FIG. 5 is a sequence diagram illustrating an operation performed by the management system when a cut-off of the power supply does not occur, according to an embodiment of the present disclosure.

Operation Performed in Case where Cut-Off of Power Supply does not Occur:

FIG. 5 is a sequence diagram illustrating an operation performed by the management system 1 when a cut-off of the power supply does not occur, according to an embodiment of the present disclosure.

A description is given of the operation performed when a cut-off the power supply does not occur at the image forming apparatus 9 with reference to the sequence diagram of FIG. 5.

In step S10, the application software 7a transmits to the image log management unit 9b, via the printer driver 7b, a log generation reservation notification that includes a printing job and indicates a notification for reserving log generation.

In step S12, in response to receiving the log generation reservation notification (including the printing job) from the application software 7a via the printer driver 7b, the image log management unit 9b transmits reservation information (including the printing job) to the storage unit 9f, to control the storage unit 9f to store the reservation information (including the print job).

In step S20, the application software 7a transmits an image log creation information recording request indicating a request to create the image log and record information to the memory management unit 9a via the printer driver 7b.

In step S22, in response to receiving the image log creation information recording request from the application software 7a via the printer driver 7b, the memory management unit 9a issues an image generation request indicating a request for generating an image to the storage unit 9f.

In step S24, in response to receiving the image generation request from the memory management unit 9a, the storage unit 9f generates an image based on the printing job.

At this time, as illustrated in FIG. 4A, the image information formed by the memory management unit 9a is stored in the storage unit 9f from the time t0 to the time t1.

In step S30, the application software 7a transmits an image log generation request indicating a request for generating an image log to the image log management unit 9b via the printer driver 7b.

In step S32, in response to receiving the image log generation request from the application software 7a via the printer driver 7b, the image log management unit 9b issues the image log generation request to the image log generation unit 9c.

In step S34, in response to receiving the image log generation request from the image log management unit 9b, the image log generation unit 9c issues the image log generation request to the storage unit 9f.

In step S36, in response to receiving the image log generation request from the image log generation unit 9c, the storage unit 9f generates log information and stores the generated log information.

At this time, as illustrated in FIG. 4A, the log information generated by the image log generation unit 9c is stored in the storage unit 9f from the time t1 to the time t2. Further, from the time t2 to the time t3, the completion information generated by the image log generation unit 9c is stored in the storage unit 9f.

In step S40, the memory management unit 9a issues a file generation notification indicating a notification of generating a file to the image log management unit 9b.

In step S42, in response to receiving the file generation notification from the memory management unit 9a, the image log management unit 9b issues a log transfer request indicating a request for transferring a log to the image log transfer unit 9d.

In step S44, in response to receiving the log transfer request from the image log management unit 9b, the image log transfer unit 9d issues the log transfer request to the storage unit 9f.

In step S46, in response to receiving the log transfer request from the image log transfer unit 9d, the storage unit 9f reads the log information generated in step S36 and transmits the log information to the server 11.

In step S50, the image log management unit 9b issues a log deletion request indicating a request for deleting the log to the image log deletion unit 9e.

In step S52, in response to receiving the log deletion request from the image log management unit 9b, the image log deletion unit 9e issues the log deletion request to the storage unit 9f.

In step S54, in response to receiving the log deletion request from the image log deletion unit 9e, the storage unit 9f deletes the log information, which is a file stored in the storage unit 9f, according to the log deletion request.

As described above, after the image log management unit 9b issues the log deletion request to the image log deletion unit 9e in step S50, the log information stored in the storage unit 9f is deleted.

Next, the power supply cutoff determination unit 9a1 or the power supply cutoff determination unit 9b1 stores a numerical value of one word in the power supply cutoff detection area of the RAM 902b, which is a volatile memory. The numerical value of one word is a unique one and preset.

Figure 6:
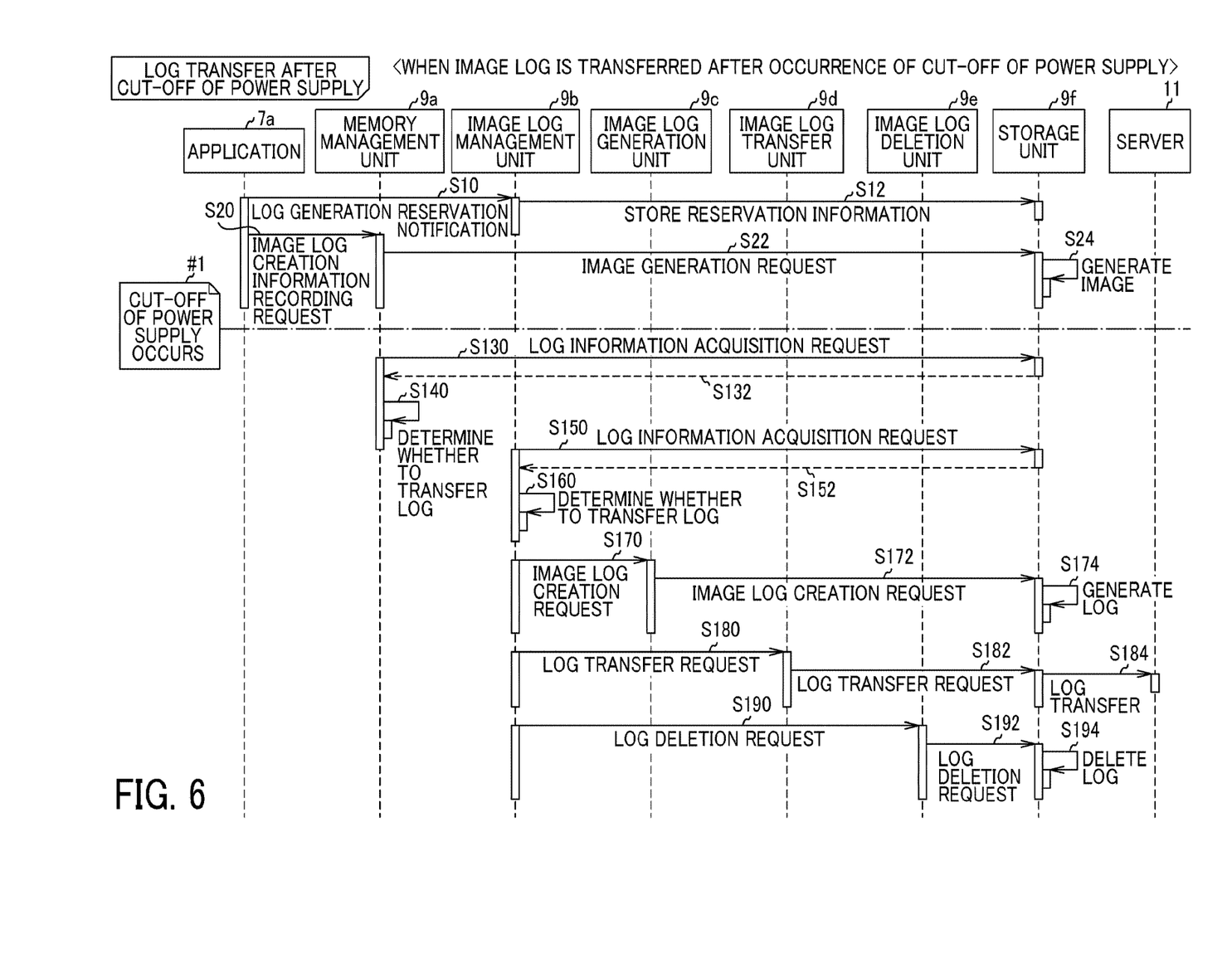
FIG. 6 is a sequence diagram illustrating an operation performed by the management system when a cut-off of the power supply occurs and transfer of the image log is performed, according to an embodiment of the present disclosure.

Case in Which Cut-off of Power Supply Occurs and Transfer of Log is Performed:

FIG. 6 is a sequence diagram illustrating an operation performed by the management system 1 when a cut-off of the power supply occurs and transfer of the image log is performed, according to an embodiment of the present disclosure.

Since the processes of steps S10 to S24 illustrated in FIG. 6 are executed in substantially the same manner as steps S10 to S24 described with reference to FIG. 5, description thereof is omitted.

Note that, as illustrated in FIG. 4A, the image information formed by the memory management unit 9a is stored in the storage unit 9f from the time t0 to the time t1.

A description is now given of a case in which, after a cut-off of the power supply occurs at an accident #1, log information related to an image is transferred.

The power supply cutoff determination unit 9a1 or the power supply cutoff determination unit 9b1 acquires the numerical value of one word from the power supply cutoff detection area of the RANI 902b, which is a volatile memory. Since the acquired numerical value is not the preset unique numerical value, the power supply cutoff determination unit 9a1 or the power supply cutoff determination unit 9b1 determines that the cut-off of the power supply has occurred. In this case, the power supply cutoff determination unit 9a1 or the power supply cutoff determination unit 9b1 turns on the power supply cutoff determination flag.

In step S130, the memory management unit 9a issues a log information acquisition request indicating a request for acquiring log information to the storage unit 9f.

In step S132, in response to receiving the log information acquisition request from the memory management unit 9a, the storage unit 9f reads the log information according to the log information acquisition request and transmits the log information to the memory management unit 9a.

In step S140, the memory management unit 9a determines whether one or more pages are present in the log information based on the log information read from the storage unit 9f in step S132, to determine whether to transfer the log information.

Specifically, the memory management unit 9a determines that the log information is to be transferred based on the determination that one or more pages are present in the log information read from the storage unit 9f. By contrast, the memory management unit 9a determines that transfer of the log information is not required based on the determination that one or more pages are not present in the log information read from the storage unit 9f.

In step S150, the image log management unit 9b issues the log information acquisition request to the storage unit 9f.

In step S152, in response to receiving the log information acquisition request from the image log management unit 9b, the storage unit 9f reads the log information according to the log information acquisition request, and transmits the log information to the image log management unit 9b.

In step S160, the image log management unit 9b determines whether one or more pages are present in the log information based on the log information read from the storage unit 9f in step S152, to determine whether to transfer the log information.

Specifically, the image log management unit 9b determines that the log information is to be transferred based on the determination that one or more pages are present in the log information read from the storage unit 9f. By contrast, the image log management unit 9b determines that transfer of the log information is not required based on the determination that one or more pages are not present in the log information read from the storage unit 9f.

In the sequence diagram of FIG. 6, the image log management unit 9b determines that one or more pages are present in the log information read from the storage unit 9f, and thus determines that the log information is to be transferred.

In step S170, the image log management unit 9b issues the image log generation request to the image log generation unit 9c.

In step S172, in response to receiving the image log generation request from the image log management unit 9b, the image log generation unit 9c issues the image log generation request to the storage unit 9f.

In step S174, in response to receiving the image log generation request from the image log generation unit 9c, the storage unit 9f generates and stores a log.

In step S180, the image log management unit 9b issues a log transfer request indicating a request for transferring the log to the image log transfer unit 9d.

In step S182, in response to receiving the log transfer request from the image log management unit 9b, the image log transfer unit 9d issues the log transfer request to the storage unit 9f.

In step S46, in response to receiving the log transfer request from the image log transfer unit 9d, the storage unit 9f reads the log information generated in step S174 and transmits the log information to the server 11.

In step S190, the image log management unit 9b issues a log deletion request indicating a request for deleting the log to the image log deletion unit 9e.

In step S192, in response to receiving the log deletion request from the image log management unit 9b, the image log deletion unit 9e issues the log deletion request to the storage unit 9f.

In step S194, in response to receiving the log deletion request from the image log deletion unit 9e, the storage unit 9f deletes the log information, which is a file stored in the storage unit 9f, according to the log deletion request.

Figure 7:
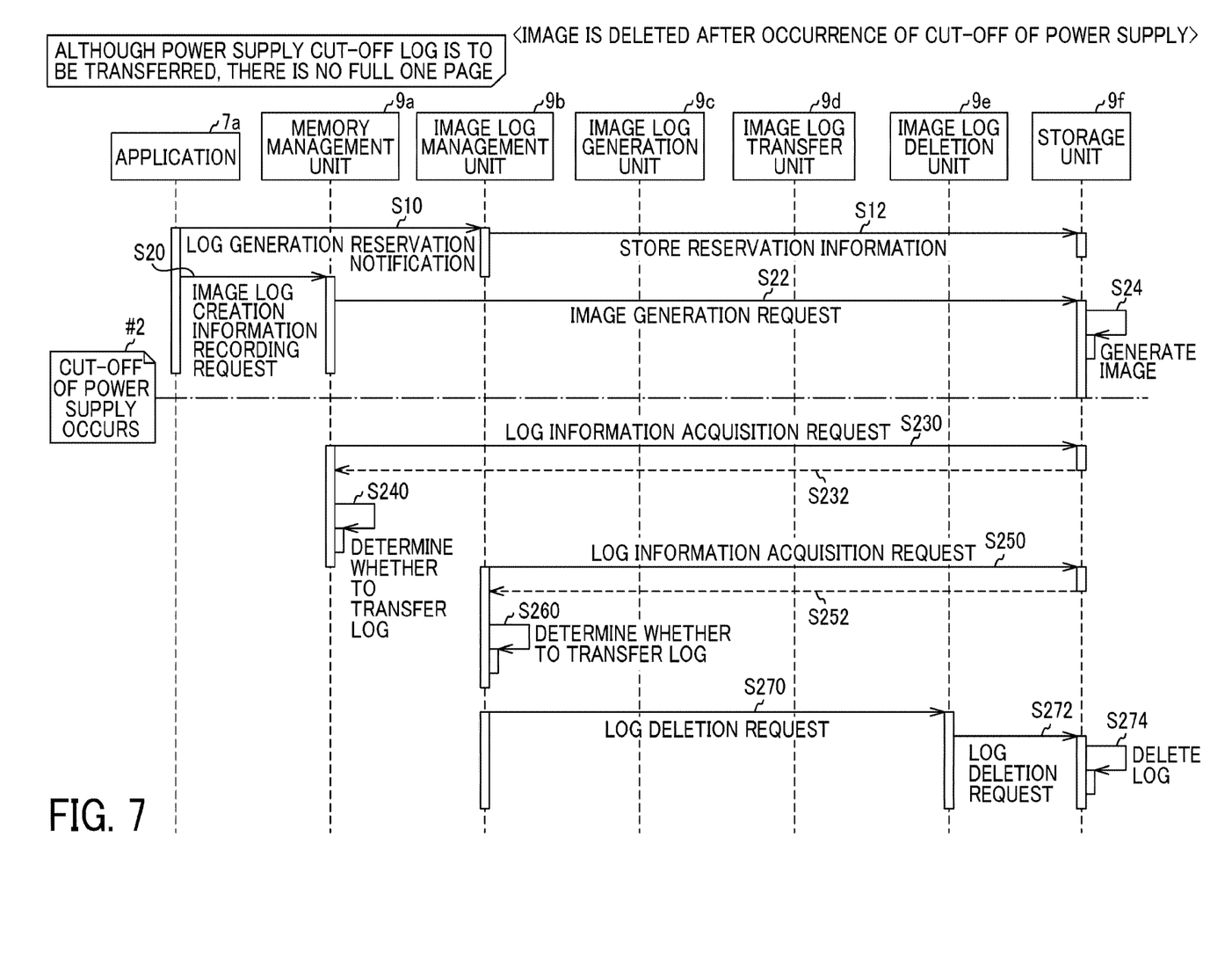
FIG. 7 is a sequence diagram illustrating an operation performed by the management system when a cut-off of the power supply occurs and transfer of the image log is not performed, according to an embodiment of the present disclosure.

Case in Which Cut-off of Power Supply Occurs and Transfer of Log is not Performed:

FIG. 7 is a sequence diagram illustrating an operation performed by the management system 1 when a cut-off of the power supply occurs and transfer of the image log is not performed, according to an embodiment of the present disclosure.

Since the processes of steps S10 to S24 illustrated in FIG. 7 are executed in substantially the same manner as steps S10 to S24 described with reference to FIG. 5, description thereof is omitted.

Note that, although as illustrated in FIG. 4A, the image information in the process of being formed by the memory management unit 9a is stored sequentially in the storage unit 9f from the time t0 to the time t1, a cut-off of the power supply occurs while the image information is being stored. Accordingly, although the image information of a certain page formed halfway is stored in the storage unit 9f, the formed up to the middle of a page, the log information or the completion information is not stored.

A description is now given of a case in which, after a cut-off of the power supply occurs at an accident #2, log information related to an image is deleted.

The power supply cutoff determination unit 9a1 or the power supply cutoff determination unit 9b1 acquires the numerical value of one word from the power supply cutoff detection area of the RAM 902b, which is a volatile memory. Since the acquired numerical value is not the preset unique numerical value, the power supply cutoff determination unit 9a1 or the power supply cutoff determination unit 9b1 determines that the cut-off of the power supply has occurred. In this case, the power supply cutoff determination unit 9a1 or the power supply cutoff determination unit 9b1 turns on the power supply cutoff determination flag.

In step S230, the memory management unit 9a issues a log information acquisition request indicating a request for acquiring log information to the storage unit 9f.

In step S232, in response to receiving the log information acquisition request from the memory management unit 9a, the storage unit 9f reads the log information according to the log information acquisition request and transmits the log information to the memory management unit 9a.

In step S240, the memory management unit 9a determines whether one or more pages are present in the log information based on the log information read from the storage unit 9f in step S232, to determine whether to transfer the log information.

Specifically, the memory management unit 9a determines that the log information is to be transferred based on the determination that one or more pages are present in the log information read from the storage unit 9f. By contrast, the memory management unit 9a determines that transfer of the log information is not required based on the determination that one or more pages are not present in the log information read from the storage unit 9f.

In step S250, the image log management unit 9b issues a log information acquisition request indicating a request for acquiring log information to the storage unit 9f.

In step S252, in response to receiving the log information acquisition request from the image log management unit 9b, the storage unit 9f reads the log information according to the log information acquisition request, and transmits the log information to the image log management unit 9b.

In step S260, the image log management unit 9b determines whether one or more pages are present in the log information based on the log information read from the storage unit 9f in step S252, to determine whether to transfer the log information.

Specifically, the image log management unit 9b determines that the log information is to be transferred based on the determination that one or more pages are present in the log information read from the storage unit 9f. By contrast, the image log management unit 9b determines that transfer of the log information is not required based on the determination that one or more pages are not present in the log information read from the storage unit 9f.

In the sequence diagram of FIG. 7, the image log management unit 9b determines that one or more pages are not present in the log information read from the storage unit 9f, and thus determines that the log information is not required to be transferred.

In step S270, the memory management unit 9a issues a log deletion request indicating a request for deleting the log to the image log deletion unit 9e.

In step S272, in response to receiving the log deletion request from the memory management unit 9a, the image log deletion unit 9e issues the log deletion request to the storage unit 9f.

In step S274, in response to receiving the log deletion request from the image log deletion unit 9e, the storage unit 9f deletes the log information, which is a file stored in the storage unit 9f, according to the log deletion request.

According to the related art, in a case in which a power is cut off while log information including image information is being created, insufficient image information remains, and unnecessary image information remains in a hard disk. This causes reduction of an available capacity of the hard disk.

According to the related art, determination as to transfer is performed before transfer of the image information.

However, in the related art, since determination whether to transfer the image data is performed based on the remaining free space of the storage, whether to delete the image information needs to be deleted is not determined.

According to an embodiment of the present disclosure, unnecessary image information does not remain in a memory, thereby preventing an available capacity of the memory from decreasing.

The embodiment described above is an example, and aspects of the present disclosure attain effects and advantages as described below.

First Aspect:

The image forming apparatus 9 of a first aspect includes: the storage unit 9f; the image log generation unit 9c configured to generate log information including formed image information based on a printing job and stores the generated log information in the storage unit 9f; the image log transfer unit 9d configured to transfer the log information stored in the storage unit 9f to the server 11 externally provided; the image log deletion unit 9e configured to delete the log information stored in the storage unit 9f. The image forming apparatus 9 includes the image log management unit 9b configured to control the image log transfer unit 9d to transfer the log information to the server 11, and controls the image log deletion unit 9e to delete the log information stored in the storage unit 9f based on determination that a predetermined condition is satisfied and that the log information is to be transferred based on the log information stored in the storage unit 9f.

According to this aspect, In a case in which the image log management unit 9b determines that the predetermined condition is satisfied and that the log information is to be transferred based on the log information stored in the storage unit 9f, the image log management unit 9b controls the image log transfer unit 9d to transfer the log information to the server 11, and controls the image log deletion unit 9e to delete the log information stored in the storage unit 9f.

Thus, unnecessary image information does not remain in the storage unit 9f, thereby preventing an available capacity of the storage unit 9f from decreasing.

Second Aspect:

The image log management unit 9b of a second aspect determines that the log information is to be transferred when the log information includes at least one print page based on the log information stored in the storage unit 9f.

According to this aspect, the image log management unit 9b determines that the log information is to be transferred when the log information includes at least one print page based on the log information stored in the storage unit 9f.

This enables the image log management unit 9b to recognize that there is a print page that is to be transferred in the storage unit 9f.

Third Aspect:

The image forming apparatus 9 of a third aspect further includes the memory management unit 9a configured to control the image log deletion unit 9e to delete the log information stored in the storage unit 9f based on determination that the predetermined condition is satisfied and that the log information is not to be required to be transferred based on the log information stored in the storage unit 9f.

According to this aspect, the memory management unit 9a controls the image log deletion unit 9e to delete the log information stored in the storage unit 9f, in a case in which the memory management unit 9a determines that the predetermined condition is satisfied and that the log information is not to be transferred based on the log information stored in the storage unit 9f.

Thus, unnecessary image information does not remain in the storage unit 9f, thereby preventing an available capacity of the storage unit 9f from decreasing.

Fourth Aspect:

The memory management unit 9a according to a fourth aspect determines that the log information is not to be transferred when the log information does not include at least one print page based on the log information stored in the storage unit 9f.

According to this aspect, the memory management unit 9a determines that the log information is not to be transferred when the log information does not include at least one print page based on the log information stored in the storage unit 9f.

This enables the memory management unit 9a to recognize that there is no print page that is to be transferred in the storage unit 9f.

Fifth Aspect:

In the image forming apparatus 9 according to this aspect, in the case in which the predetermined condition is satisfied is a case in which a cut-off of a power supply occurs and thereafter the image forming apparatus 9 is restarted.

According to this aspect, the case in which the image forming apparatus is restarted after the cut-off of the power supply has occurred is recognized as the case in which the predetermined condition is satisfied.

Sixth Aspect:

The image log management unit 9b of a sixth aspect includes a power supply cutoff determination unit 9b1 configured to determine whether the cut-off of the power supply has occurred.

According to this aspect, it is possible to determine whether the cut-off of the power supply has occurred.

Seventh Aspect:

The memory management unit 9a of a seventh aspect includes the power supply cutoff determination unit 9a1 configured to determine whether the cut-off of the power supply has occurred.

According to this aspect, it is possible to determine whether the cut-off of the power supply has occurred.

Eighth Aspect:

The image log generation unit 9c of an eighth aspect adds the completion information indicating that the generation of the log information is completed to the log information when the generation of the log information is completed, and stores the log information to which the completion information is added in the storage unit 9f.

When the completion information is not added to the log information, the power supply cutoff determination unit 9a1 or the power supply cutoff determination unit 9b1 determines that the cut-off of the power supply has occurred, based on the log information stored in the storage unit 9f.

According to this aspect, the image log generation unit 9c adds the completion information indicating that the generation of the log information is completed to the log information when the generation of the log information is completed, and stores the log information to which the completion information is added in the storage unit 9f, and the power supply cutoff determination unit 9a1 or the power supply cutoff determination unit 9b1 determines that the cut-off of the power supply has occurred, based on the log information stored in the storage unit 9f, when the completion information is not added to the log information.

Thus, it can be determined that the cut-off of the power supply has occurred.

Ninth Aspect:

A management system according a ninth aspect includes the image forming apparatus 9 according to any one of the first to eighth aspects and the server 11 that stores log information transferred from the image forming apparatus 9.

According to this aspect, the management system is provided that includes the image forming apparatus 9 and the server 11 that stores the log information transferred from the image forming apparatus 9.

Tenth Aspect:

A method for managing the image forming apparatus 9 of a tenth aspect includes: an image log generation step (S172) of generating log information including formed image information based on a printing job and storing the generated log information in the storage unit 9f; an image log transfer step (S182) of transferring the log information stored in the storage unit 9f to the server 11 externally provided; an image log deletion step (S192) of deleting the log information stored in the storage unit 9f. The method of managing the image forming apparatus 9 further includes an image log management step (S190) of controlling the image log transfer step to transfer the log information to the server 11, and controlling the image log deletion step to delete the log information stored in the storage unit 9f based on determination that a predetermined condition is satisfied and that the log information is to be transferred based on the log information stored in the storage unit 9f.

The effects and advantages of the tenth aspect are the same or substantially the same as those of the first aspect, and therefore redundant descriptions thereof are omitted.

Eleventh Aspect:

A program of an eleventh aspect causes a processor to execute each step in the method of managing the image forming apparatus 9 of the tenth aspect.

The effects and advantages of the eleventh aspect are the same or substantially the same as those of the tenth aspect, and therefore redundant descriptions thereof are omitted.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An image forming apparatus comprising:
a memory;
a volatile memory provided separately from the memory; and
circuitry configured to
generate log information including formed image information, based on a printing job;
store the log information in the memory;
acquire a value from the volatile memory;
determine whether the value acquired from the volatile memory is a preset value;
determine, in accordance with whether the value acquired from the volatile memory is the preset value, whether a predetermined condition is satisfied, the predetermined condition being that a cut-off of a power supply occurs and thereafter the image forming apparatus is restarted; and
transfer the log information to a server that is externally provided and delete the log information stored in the memory based on determination that the predetermined condition is satisfied and that the log information is to be transferred based on the log information stored in the memory.

2. The image forming apparatus of claim 1, wherein
the circuitry determines that the log information is to be transferred when the log information includes at least one print page based on the log information stored in the memory.

3. The image forming apparatus of claim 1, wherein
the circuitry is further configured to control the memory to delete the log information stored in the memory based on determination that the predetermined condition is satisfied and that the log information is not to be transferred based on the log information stored in the memory.

4. The image forming apparatus of claim 3, wherein
the circuitry determines that the log information is not to be transferred when the log information does not include at least one print page based on the log information stored in the memory.

5. The image forming apparatus of claim 1, wherein the circuitry is further configured to:
add completion information indicating that generation of the log information is completed to the log information when the generation of the log information is completed;
store the log information to which the completion information is added in the memory; and
determine that the cut-off of the power supply has occurred, when the completion information is not added to the log information, based on the log information stored in the memory.

6. A method of managing an image forming apparatus, the method comprising:
generating log information including formed image information, based on a printing job;
storing the log information in a memory;
acquiring a value from a volatile memory provided separately from the memory;
determining whether the value acquired from the volatile memory is a preset value;
determining, in accordance with whether the value acquired from the volatile memory is the preset value, whether a predetermined condition is satisfied, the predetermined condition being that a cut-off of a power supply occurs and thereafter the image forming apparatus is restarted; and
transferring the log information to a server that is externally provided and delete the log information stored in the memory based on determination that the predetermined condition is satisfied and that the log information is to be transferred based on the log information stored in the memory.

7. The method of managing the image forming apparatus of claim 6, wherein the transferring includes determining that the log information is to be transferred when the log information includes at least one print page based on the log information stored in the memory.

8. The method of managing the image forming apparatus of claim 6, further comprising controlling the memory to delete the log information stored in the memory based on determination that the predetermined condition is satisfied and that the log information is not to be transferred based on the log information stored in the memory.

9. A management system comprising:
a server; and
an image forming apparatus including:
a memory;
a volatile memory provided separately from the memory; and
circuitry configured to
generate log information including formed image information, based on a printing job;
store the log information in the memory;
acquire a value from the volatile memory;
determine whether the value acquired from the volatile memory is a preset value;
determine, in accordance with whether the value acquired from the volatile memory is the preset value, whether a predetermined condition is satisfied, the predetermined condition being that a cut-off of a power supply occurs and thereafter the image forming apparatus is restarted; and
transfer the log information to the server and delete the log information stored in the memory based on determination that the predetermined condition is satisfied and that the log information is to be transferred based on the log information stored in the memory.

10. The management system of claim 9, wherein
the circuitry determines that the log information is to be transferred when the log information includes at least one print page based on the log information stored in the memory.

11. The management system of claim 9, wherein
the circuitry is further configured to control the memory to delete the log information stored in the memory based on determination that the predetermined condition is satisfied and that the log information is not to be transferred based on the log information stored in the memory.

* * * * *